Figure 1:
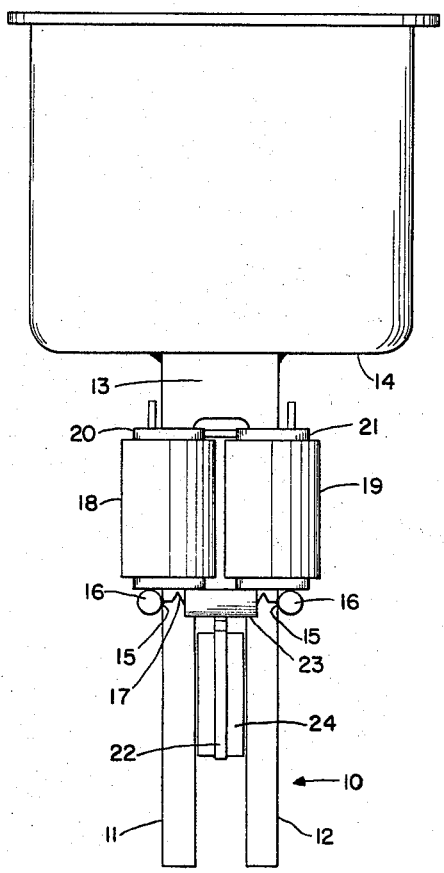

Oct. 25, 1960

C. W. DICKEY 2,957,994

MAGNETOSTRICTIVE TRANSDUCER

Filed Feb. 21, 1958

INVENTOR.
CLYDE W. DICKEY
BY
*Grover A. Frater*
ATTORNEY

United States Patent Office 2,957,994
Patented Oct. 25, 1960

2,957,994
MAGNETOSTRICTIVE TRANSDUCER

Clyde W. Dickey, Philipsburg, Pa., assignor to The Bendix Corporation, a corporation of Delaware Filed Feb. 21, 1958, Ser. No. 716,662

6 Claims. (Cl. 310—26)

This invention relates to magnetostrictive ultrasonic transducers; and one object of the invention is to provide a magnetostrictive transducer capable of production at a fraction of the cost of previous transducers.

Another object is to provide such an inexpensive transducer without sacrificing efficiency of ultrasonic energy production but with an actual increase in efficiency.

Magnetostrictive materials such, for example, as nickel, undergo a change in physical dimensions when subjected to a magnetic flux of varying intensity. The degree of motion increases when the variation in magnetic flux intensity is increased and the motion occurs as a traveling wave. Elongation of one segment of the bar near its nodal or mid-plane results in displacement of all segments nearer the end which also experience elongation. Since the elongation occurs over a finite period, the effect is a mechanical wave motion traveling through the bar.

This wave is capable of and will be reflected upon reaching a plane at which the impedance to wave motion is changed. The impedance of air is much higher than that of metallic elements and liquids so that if the magnetostrictive bar is secured at one end to a work load, such as a container of liquid in an ultrasonic cleaner, with its opposite end extending free in atmosphere, the wave traveling toward the free end will be substantially entirely reflected to the opposite end of the bar and there absorbed in the load. Motion at the load end will tend to be doubled whereby the increase in wave energy input will approach four-fold. Dissymetry in the transducer impedance results in wave reflections which normally result in concellation of part of the wave motion with resultant loss in efficiency.

Various transducer forms have been proposed in the past, presumably in attempts to recognize these principles, and among them were transducers of bifurcated construction. The bifurcated construction having the advantage that motion of one leg was not tied to the other. However, the magnetostrictive transducer is responsive to changes in magnetic flux density and insensitive to flux polarity so that when subjected to an alternating flux the elongation of the transducer occurs at twice the frequency of the flux alternations. To avoid this it is necessary to bias the transducer magnetically so that the alternating magnetism never exceeds the bias. Thus the transducer core must provide a path for both unidirectional flux and alternating flux. The amount of the flux change determines the degree of dimensional change in the core but the gap between the legs of a bifurcated transducer presents high reluctance in the flux path and results in a lesser degree of flux change.

Because of failure to solve this problem the bifurcated construction failed and in commercial practice transducer cores were provided with window cutouts providing legs around which the energizing coils are wound by threading an end of the wire through the window repeatedly to provide the required number of turns. This very expensive and painstaking process was practiced so that continuity of the magnetic flux paths could be preserved. Moreover where the cores were formed of lamination stacks, these were clamped together, often by a bolt extending through perforations in the laminations, and other precautions were taken to provide a mechanically, and so an electrically, unitary structure.

But in the invention this construction is abolished and the use of the furcated core is made possible. At the end opposite the load, the core legs are not mechanically connected, the core is not perforated, and laminations, if used, are not bound together. Each leg and each lamination is secured to the other only at their common connection to the load so that rather than forming part of a unitary structure as in the past each is free to elongate and reflect wave energy to the load unfettered by mechanical ties to the other. Laminations not perfectly bonded to the load, experiencing lower flux density, or having differing elongation characteristics cannot limit magnetostrictive action of the whole core to that of the least active. Moreover, the gain in mechanical efficiency has more than offset loss in electrical efficiency, incident to discontinuity of the magnetic circuit at the open end of the transducer core, by use of a novel magnetic biasing arrangement.

That permanent magnets included in the magnetic circuit of the core can be used to polarize the core and overcome double frequency wave generation has been known. However, the practice has been to connect ordinary magnets rigidly in place or employ other means to minimize discontinuity in the magnetic circuit and keep its permeability high. In the invention however, a magnet having magnetic permeability near unity, the permeability of air, is suspended between the core legs so that wave motion in the legs is not substantially hindered and so that magnetic flux induced by the energizing coils of the tranducer is not short circuited through the magnet but will follow a path substantially as though the magnet was not present whereby electrical efficiency is enhanced.

In addition to these advantages, the open core construction enables the use of laminations which may be punched without waste from strip stock, a very significant advantage in view of the cost of nickel and other magnetostrictive materials. Instead of being threaded through a core window, the excitation coils may be prewound and slipped into place, and perforations, bolts, clamps, welds, and the like previously used to provide a unitary core structure, are simply eliminated.

Other objects and advantages of the invention will hereinafter appear.

One embodiment of the invention is illustrated in the accompanying drawing, it being understood that various modifications may be made in the embodiment illustrated and that other embodiments are possible without departing from the scope or spirit of the appended claims.

Figure 2:
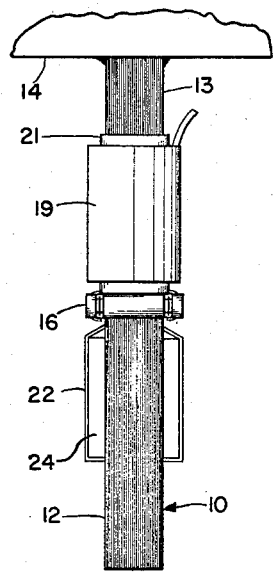

Fig. 1 and Fig. 2 of the drawing are front and side views in elevation, respectively, of a load transducer embodying the invention.

The transducer core, generally designated 10, is advantageously formed by a stack of laminations made from magnetostrictive material such as nickel, as shown. The core 10 comprises a pair of legs 11 and 12 of equal length, arranged in parallel, and joined at one end by magnetostrictive material formed integrally therewith so that the stack in each lamination is U-shaped.

The end of the stack 13 representing the portion of the U-shaped core interconnecting legs 11 and 12 is secured by any convenient means to a load element so that the end of each lamination is fixed to the load element 14. The load selected for illustration comprises a container for cleaning liquid such as used in ultrasonic cleaning processes.

The opposite end of the transducer stack, comprising the opposite ends of legs 11 and 12, extends into the atmosphere and neither the legs nor the individual laminations are interconnected at this end.

At the outer side of legs 11 and 12 at the nodal plane mechanically midway along the length of core 10, the individual laminations are provided with shallow notches 15. A pair of pins 16 disposed in these notches and there held by spring elements 17, connecting the respective ends of pins 16, serve to hold the transducer energizing windings 18 and 19 and a polarizing magnet 24 in proper relation to the core 10.

Windings 18 and 19 are wound in opposite directions but otherwise may be alike, as shown. Each comprises a series of wire turns wound about a hollow insulating core 20 and 21, respectively, which encircles an associated one of the core legs 11 and 12.

The polarizing magnet is of a type having permeability approaching unity and is polarized across its smaller, thickness dimension. It is supported between legs 11 and 12 by an encircling bracket 22 whose upper ends 23 are held by spring elements 17.

In operation of the transducer, windings 18 and 19 are subjected to an alternating current the wave length of whose frequency is substantially twice as long as the mechanical length of core 10. Upon being energized, windings 18 and 19 induce an alternating magnetic flux in the core 10 which extends in a path defined by leg 11 the upper end 13 of the core leg 12 and the air space intermediate legs 11 and 12. The magnet 24 having permeability near unity has substantially no effect in determining a path of the alternating magnetic flux. A unidirectional flux established by the permanent magnet 24 is super-imposed on the alternating flux induced by windings 18 and 19.

As the resultant flux varies in intensity, transducer core 10 is elongated in both directions from the nodal plane at notches 15 resulting in a magnetic wave motion directed towards the respective ends of core 10. That wave traveling toward the load 14 will be dissipated in the load. The other wave traveling toward the free end of core 10 will be reflected upon reaching the end of the transducer and will travel back through legs 11 and 12 to enhance the succeeding wave, generated by the succeeding flux variation, so that both waves will travel in phase to the load 14. Except for their common connection to the load 14, the laminations which comprise core 10 are not mechanically connected so that the energy dissipated in the load is equal to the sum of the energy transmitted thereto in each lamination and so that any lamination undergoing reduced ultrasonic action cannot inhibit the action of the others.

Pins 16 and spring element 17 are not fixed to any lamination and are located in the nodal plane of all laminations so they exhibit negligible effect on the ultrasonic action of any lamination.

As it is used herein, the word "ultrasonic" refers to mechanical wave action and does not refer to a wave action limited to any frequency or frequency range within or without the range of audible frequencies.

I claim:

1. In a magnetostrictive ultrasonic transducer, a core formed of magnetostrictive material and comprising at least two legs of substantially equal length disposed in parallel and interconnected at one end only by like magnetostrictive material integrally formed with said legs, a permanent magnet having magnetic permeability substantially like that of air interposed between said legs, and a load element fixed to the interconnected ends of said legs.

2. In a magnetostrictive ultrasonic transducer, a core formed of magnetostrictive material and comprising at least two legs of substantially equal length disposed in parallel and interconnected at one end only by like magnetostrictive material integrally formed with said legs, a permanent magnet having magnetic permeability substantially like that of air interposed between said legs, an energizing coil magnetically coupled to said legs, the other end of said legs extending freely in atmosphere.

3. The combination defined in claim 2 in which said core is formed of stacked laminations.

4. In a magnetostrictive transducer, a core comprising unperforated, stacked, U-shaped laminations formed of magnetostrictive material and having elongated legs, a load element fixed to the end of each of said laminations at the interconnected ends of said legs, a permanent magnet having a magnetic permeability substantially like that of air interposed between said legs, and an energizing coil magnetically coupled to at least one of said legs.

5. The combination defined in claim 4 in which said magnet is suspended from said legs at points in the nodal plane midway along said legs.

6. In a magnetostrictive transducer, a core comprising unperforated, stacked, U-shaped laminations formed of magnetostrictive material and having elongated legs, a load element fixed to the end edge of said laminations at the interconnected ends of said legs, each of said legs being notched in their nodal plane, means for suspending a magnet in position between said legs without substantial clamping together of the laminations comprising pins disposed in said notches and springs interconnecting said pins at their corresponding ends, and a permanent magnet having magnetic permeability near unity interposed between said legs and suspended from said springs.

References Cited in the file of this patent

UNITED STATES PATENTS

| | | |
|---|---|---|
| 2,437,270 | Peek | Mar. 9, 1948 |
| 2,550,771 | Camp | May 1, 1951 |
| 2,738,173 | Massa | Mar. 13, 1956 |
| 2,815,193 | Brown | Dec. 3, 1957 |